United States Patent [19]

Dibben et al.

[11] 3,861,518
[45] Jan. 21, 1975

[54] CONVEYING APPARATUS
[75] Inventors: David W. Dibben, Bellesville; Madhusudan R. Bastikar, Willowdale, both of Ontario, Canada
[73] Assignee: Borg-Warner Ltd., Oakville, Ontario, Canada
[22] Filed: Oct. 15, 1973
[21] Appl. No.: 406,726

[52] U.S. Cl. .............................. 198/151, 198/140
[51] Int. Cl. .......................................... B65g 17/12
[58] Field of Search .......... 198/140, 151, 193, 194, 198/198, 199

[56] References Cited
UNITED STATES PATENTS
2,873,844  2/1959  Curtiss .............................. 198/151
3,670,870  6/1972  Cheek ............................... 198/193

FOREIGN PATENTS OR APPLICATIONS
1,092,835  11/1960  Germany .......................... 198/193

Primary Examiner—Evon C. Blunk
Assistant Examiner—Joseph E. Valenza
Attorney, Agent, or Firm—Arthur M. Streich

[57] ABSTRACT

A bucket elevator reclaimer which is used to dig or elevate bulk material in which a steel cord reinforced belt is used to support and carry the buckets. The belt comprises a rubber or rubber-like covering reinforced with steel cable and at intervals along the length of the belt, clamps which extend across the belt and engage the cable are provided to which the buckets are fastened.

2 Claims, 4 Drawing Figures

PATENTED JAN 21 1975
3,861,518
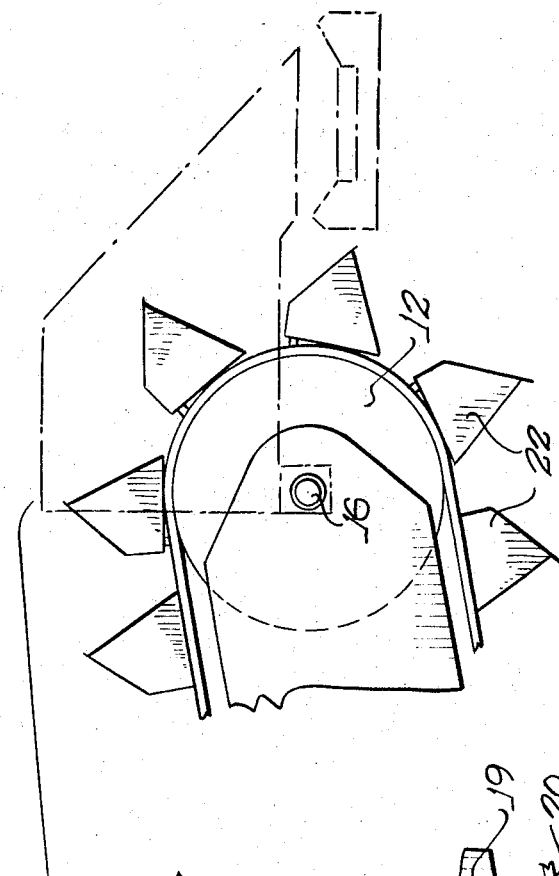
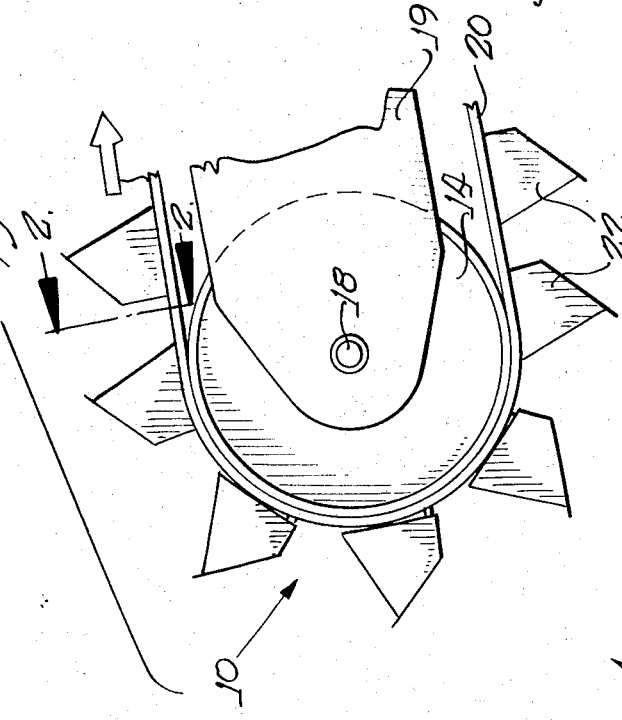
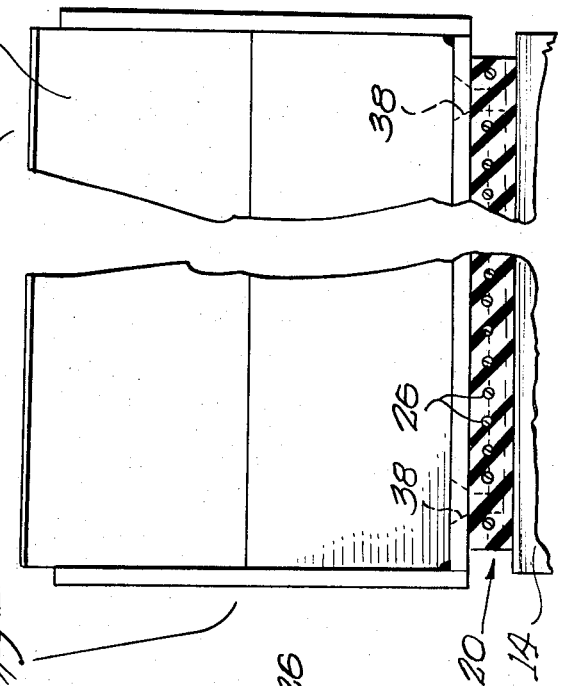
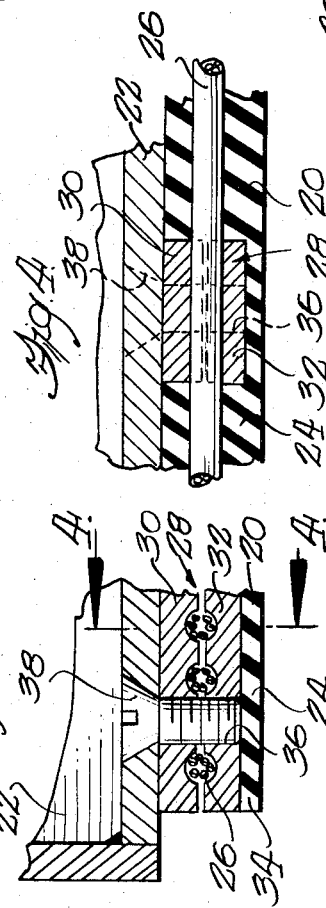

CONVEYING APPARATUS

BACKGROUND OF THE INVENTION

Bucket wheel reclaimers or conveyors are known in the art. Generally these devices comprise an endless belt to which the buckets are attached. It is a common practice to secure the buckets to the belts by using headed bolts or rivets which pass through the belt and through openings in the buckets. While the belt may be reinforced, the buckets when used to convey heavy material can become detached from the belt because of the weakness of the fastening arrangement. In such cases, the belt can be damaged by the shearing of the bucket therefrom.

According to this invention, the conveyor belt to which buckets are attached for a bucket wheel reclaimer is reinforced with cord such as steel cable and at spaced intervals, clamp means which clampingly engage the reinforcing cable and to which the buckets are attached are embedded therein. The buckets are screwed to the clamp means; the attachment which also provides the clamping action is stronger than that previously provided and the buckets can be more easily removed and/or attached than by using rivets and/or bolts with the appropriate nuts.

THE DRAWINGS

FIG. 1 is a side view of a typical bucket wheel reclaimer;

FIG. 2 is a sectional view taken on line 2—2 of FIG. 1;

FIG. 3 is an enlarged longitudinal view taken through the belt of FIGS. 1 and 2 with parts of the bucket wheel broken away; and FIG. 4 is an enlarged crosssectional view taken on line 4—4 of FIG. 3.

DETAILED DESCRIPTION

Referring to the drawings, FIGS. 1 and 2 show a bucket wheel reclaimer 10 comprising a driving pulley or idler 12 and a driven pulley or idler 14 suitably journeled for rotation at 16 and 18 in a supporting framework 19 (the details of which are not shown because of conventional construction not forming a part of this invention). A suitable prime mover (not shown) is provided to drive the pulley 12. An endless belt 20 is entrained over the pulleys 12 and 14 to which spaced buckets 22 are connected.

The belt 20 (see FIGS. 3 and 4) comprises a mass of rubber or rubber-like material 24 reinforced by one or more metallic cables or cords 26. When one cable is used, the wind is helical; a plurality of individual cables can be used. Clamp means 28, each comprising a pair of clamping plates 30, 32, span the width of the belt. Each is formed with appropriate depressions to receive portions of the reinforcing cables and are disposed in the belt at spaced intervals, such that, preferably, a continuous rubber back portion 34 to engage the pulleys is provided. At spaced locations, each clamping means has threaded openings 36 to receive screws 38 used to provide the clamping action and to attach the buckets 22 thereto. As can be readily understood, this insures attachment of the buckets to the belt in such a manner as to eliminate the shearing of the buckets to the belt and permits the equipment to handle material not otherwise possible by devices known in the art. It should be understood that separate means may be provided for providing the clamping action and for attaching the buckets to the belt.

It is also to be understood that the description of the belt and attachment structure is not limited to bucket wheel reclaimers but is usable in other forms of apparatus in which attachments to belts are subject to forces which tend to shear them from the belt.

A bucket wheel reclaimer such as described finds particular use in apparatus for unloading ships and as such may be ship supported. Also, the reclaimer may be ground supported for reclaiming bulk material from piles of bulk material previously stored for use by other conveying equipment.

We claim:

1. In a bucket wheel reclaiming apparatus which comprises a pair of spaced and supported pulleys, an endless loop belt of flexible and elastic material having an inner loop layer with a surface entrained to pass over and engage said pulleys, and said belt having a plurality of longitudinally extending and laterally spaced reinforcing cables embedded therein with the cables outwardly of the pulley engaging inner surface of the belt, the improvement which comprises:

a. the inner loop surface of flexible material inwardly of the cables being formed imperforate and arranged to engage each pulley across the full width of the belt between laterally spaced outer edges of the belt and to continuously engage each pulley along the full longitudinal length of a portion of the belt turning around the periphery of each pulley;

b. said belt having a plurality of longitudinally spaced apart discontinuous portions of the flexible material projecting outwardly of the inner continuous loop surface to encompass the cables and project outwardly of the cables;

c. clamping means located outwardly of the inner continuous loop surface and in spaces between the discontinuous portions of the flexible material with said clamping means being securely attached directly to said cables, and an outer surface of the clamping means comprising a plate exposed outwardly of said belt along the entire lateral width of the plate and with the plate spanning the entire distance between the edges of said belt; and, d. a bucket removably secured to the exposed outer surface of the clamping means plate and thus to the belt.

2. An apparatus according to claim 1 in which said clamping means plate has an outer surface parallel to the cables and which across the full width thereof between laterally spaced edges of the belt is contiguous to the outer surfaces of adjacent of the longitudinally discontinuous portions of the flexible material, to present a bucket mounting plate surface of the clamping means which extends the full width of the belt and is flush with the outer surfaces of the discontinuous portions of the flexible material.

* * * * *